US011584195B2

(12) United States Patent
Shin et al.

(10) Patent No.: US 11,584,195 B2
(45) Date of Patent: Feb. 21, 2023

(54) TIME SHARING CONTROL OF TRANSPORT REFRIGERATION SYSTEM

(71) Applicant: Carrier Corporation, Palm Beach Gardens, FL (US)

(72) Inventors: Jaegue Shin, New Britain, CT (US); Xu She, Cohoes, NY (US); XuQiang Liao, Manlius, NY (US); HanJong Kim, Avon, CT (US); Ismail Agirman, Southington, CT (US); David Ginsberg, Granby, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 125 days.

(21) Appl. No.: 17/082,369

(22) Filed: Oct. 28, 2020

(65) Prior Publication Data

US 2021/0129630 A1 May 6, 2021

Related U.S. Application Data

(60) Provisional application No. 62/930,733, filed on Nov. 5, 2019.

(51) Int. Cl.
*B60H 1/32* (2006.01)
*B60L 50/50* (2019.01)
(Continued)

(52) U.S. Cl.
CPC ............ *B60H 1/3226* (2013.01); *B60L 1/003* (2013.01); *B60L 50/50* (2019.02); *B60L 53/20* (2019.02); *H02J 7/0068* (2013.01); *B60P 3/20* (2013.01)

(58) Field of Classification Search
CPC .............. B60H 1/3226; B60H 1/00428; Y02T 10/7072; Y02T 90/01; B60L 1/003;
(Continued)

(56) References Cited

U.S. PATENT DOCUMENTS 5,055,702 A   10/1991   Bhattacharya
5,065,587 A   11/1991   Howland et al.
(Continued)

FOREIGN PATENT DOCUMENTS

CN   109099624 A     12/2018
JP   2004274920 A  *  9/2004    ............... H20J 7/14
(Continued)

OTHER PUBLICATIONS

European Search Report for Application No. 20204456.6; dated Apr. 6, 2021; 7 Pages.

*Primary Examiner* — Jared Fureman
*Assistant Examiner* — Duc M Pham
(74) *Attorney, Agent, or Firm* — Cantor Colburn LLP

(57) ABSTRACT

A transportation refrigeration system including: a transportation refrigeration unit comprising a motor; a power conversion unit configured convert an amplitude, a frequency and a phase of an input electrical power signal, wherein the power conversion unit comprises a first power bridge, a DC link and a second power bridge; an energy storage device configured to supply electrical power to the motor via the power conversion unit during a road mode; a first switch configured to selectively connect the first power bridge to the energy storage device or the motor; and a second switch configured to selectively connect the second power bridge to the motor or a power grid; wherein the first switch and second switch are positioned to connect the first power bridge and second power bridge to specified sources and outputs during each of the road mode and the standby mode.

20 Claims, 9 Drawing Sheets

(51) Int. Cl.
*B60L 53/20* (2019.01)
*B60L 1/00* (2006.01)
*H02J 7/00* (2006.01)
*B60P 3/20* (2006.01)

(58) Field of Classification Search
CPC ........ B60L 50/50; B60L 53/20; H02J 7/0048; F25D 11/003; F25D 2400/40; F25D 29/003; F25D 2600/02; B60P 3/20
See application file for complete search history.

(56) References Cited

U.S. PATENT DOCUMENTS

2008/0157593 A1\* 7/2008 Bax .................. B60L 50/61
307/19
2020/0391574 A1\* 12/2020 Ducher ................ F25D 11/003

FOREIGN PATENT DOCUMENTS

JP 2004274920 A 9/2004
WO 2018226389 A1 12/2018

\* cited by examiner

TIME SHARING CONTROL OF TRANSPORT
REFRIGERATION SYSTEM

CROSS-REFERENCE TO RELATED
APPLICATIONS

This application claims the benefit of Provisional Application No. 62/930,733 filed Nov. 5, 2019, the disclosure of which is incorporated herein by reference in its entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, components of the transportation refrigeration unit (such as a compressor) can be powered by an electric current supplied by a battery during a "road mode" and an electric current supplied by a power grid during a "standby mode." A "road mode" refers to a mode of operation in which the transport refrigeration system is unconnected to a power grid, such as when a refrigerated vehicle is in transit. Conventionally, when in road mode, the transportation refrigeration system has one source (e.g., a battery) and one load (e.g., the compressor motor), which requires the use of two power bridges and a DC link to convert the electrical characteristics (e.g., amplitude, phase, frequency) of the power between them. A "standby mode" refers to a mode of operation in which the transport refrigeration system is connected to a power grid, such as when a refrigerated vehicle is parked and plugged in to a charging station. Conventionally, when in standby mode, the transportation refrigeration system has an additional source (e.g., the power grid), which requires the use of a third power bridge and an additional DC link. Each power bridge includes a converter or inverter, which is typically an expensive component. Therefore it is desirable to provide the functionalities of a conventional road mode and standby mode using less power bridges.

BRIEF DESCRIPTION

According to one embodiment, a transport refrigeration system is provided. The transportation refrigeration system including: a transportation refrigeration unit including a motor; a power conversion unit configured to convert an amplitude, a frequency and a phase of an input electrical power signal, wherein the power conversion unit includes a first power bridge, a DC link and a second power bridge; an energy storage device configured to supply electrical power to the motor via the power conversion unit during a road mode; a first switch configured to selectively connect the first power bridge to the energy storage device or the motor; and a second switch configured to selectively connect the second power bridge to the motor or a power grid; wherein during the road mode, the first switch is positioned to connect the first power bridge to the energy storage device and the second switch is positioned to connect the second power bridge to the motor, wherein during a standby mode, the second switch is positioned to connect the second power bridge to the power grid, wherein during a first time share phase of the standby mode, the first switch is positioned to connect the first power bridge to the energy storage device, and wherein during a second time share phase of the standby mode, the first switch is positioned to connect the first power bridge to the motor.

In addition to one or more of the features described above, or as an alternative, further embodiments of the transport refrigeration system may include a controller configured to control the positions of the first switch and second switch during the road mode and the standby mode.

In addition to one or more of the features described above, or as an alternative, further embodiments of the transport refrigeration system may include that the controller is configured to determine a duration of the first time share phase and a duration of the second time share phase and change the position of the first switch at an expiration of the first time share phase and at an expiration of the second time share phase.

In addition to one or more of the features described above, or as an alternative, further embodiments of the transport refrigeration system may include that the controller is configured to continuously cycle between the first time share phase and the second time share phase until the road mode is initiated.

In addition to one or more of the features described above, or as an alternative, further embodiments of the transport refrigeration system may include that the controller is configured to determine the duration of the first time share phase and the duration of the second time share phase based on a measurement of a charge of the energy storage device.

In addition to one or more of the features described above, or as an alternative, further embodiments of the transport refrigeration system may include that the controller is configured to reduce the duration of the first time share phase in response to determining that the charge of the energy storage device exceeds a threshold charge level.

In addition to one or more of the features described above, or as an alternative, further embodiments of the transport refrigeration system may include that the controller is configured to determine the duration of the first time share phase and the duration of the second time share phase based on a measurement of a temperature of a cargo space of the transport refrigeration system.

In addition to one or more of the features described above, or as an alternative, further embodiments of the transport refrigeration system may that the controller is configured to increase the duration of the second time share phase in response to determining that the temperature of the cargo space is below a threshold temperature level.

According to another embodiment, a method of operating a transport refrigeration system including a vehicle integrally connected to a transport container is provided. The method including: during a road mode of operation of the transport refrigeration system, placing a first switch and a second switch in a first configuration, wherein the first configuration includes positioning the first switch to connect a first power bridge of a power conversion unit of the transport refrigeration system to an energy storage device and positioning the second switch to connect a second power bridge of the power conversion unit of the transport refrigeration system to a motor of a transportation refrigeration unit of the transport refrigeration system; during a standby mode of operation of the transportation refrigeration unit, repeatedly cycling between a second configuration of the first switch and the second switch and a third configuration of the first switch and the second switch, wherein the second configuration includes positioning the first switch to connect the first power bridge to the energy storage device and positioning the second switch to connect the second power bridge to a power grid; wherein the third configuration includes positioning the first switch to connect the first power bridge to the motor and positioning the second switch to connect the second power bridge to the power grid.

In addition to one or more of the features described above, or as an alternative, further embodiments of the method of operating a transport refrigeration system may include that during the first configuration, the motor is supplied with power from the energy storage device via the power conversion unit.

In addition to one or more of the features described above, or as an alternative, further embodiments of the method of operating a transport refrigeration system may include that during the second configuration, the energy storage device is charged with power from the power grid via the power conversion unit.

In addition to one or more of the features described above, or as an alternative, further embodiments of the method of operating a transport refrigeration system may include that during the third configuration, the motor is supplied with power from the power grid via the power conversion unit.

In addition to one or more of the features described above, or as an alternative, further embodiments of the method of operating a transport refrigeration system may include determining, by a controller, a duration of the second configuration and a duration of the third configuration of a cycle.

In addition to one or more of the features described above, or as an alternative, further embodiments of the method of operating a transport refrigeration system may include that the controller determines the duration of the second configuration based on a measured charge of the energy storage device.

In addition to one or more of the features described above, or as an alternative, further embodiments of the method of operating a transport refrigeration system may include that the controller determines the duration of the third configuration based on a measured temperature of a cargo space of the transport refrigeration system.

According to another embodiment, a transport refrigeration system is provided. The transportation refrigeration system including: a transportation refrigeration unit including a motor; a power conversion unit configured to convert an amplitude, a frequency and a phase of an input electrical power signal, wherein the power conversion unit includes a first power bridge, a DC link and a second power bridge; an energy storage device configured to supply electrical power to the motor via the power conversion unit during a road mode; a first switch configured to selectively connect the first power bridge to the energy storage device or a power grid; and a second switch configured to selectively connect the second power bridge to the motor or the power grid; wherein during the road mode, the first switch is positioned to connect the first power bridge to the energy storage device and the second switch is positioned to connect the second power bridge to the motor, wherein during a first time share phase of the standby mode, the first switch is positioned to connect the first power bridge to the energy storage device and the second switch is positioned to connect the second power bridge to the power grid, and wherein during a second time share phase of the standby mode, the first switch is positioned to connect the first power bridge to the power grid and the second switch is positioned to connect the second power bridge to the motor.

In addition to one or more of the features described above, or as an alternative, further embodiments of the transport refrigeration system may include a controller configured to control the positions of the first switch and second switch during the road mode and the standby mode.

In addition to one or more of the features described above, or as an alternative, further embodiments of the transport refrigeration system may include that the controller is configured to determine a duration of the first time share phase and a duration of the second time share phase and change the positions of the first switch and the second switch at an expiration of the first time share phase and at an expiration of the second time share phase.

In addition to one or more of the features described above, or as an alternative, further embodiments of the transport refrigeration system may include that the controller is configured to continuously cycle between the first time share phase and the second time share phase until the road mode is initiated.

In addition to one or more of the features described above, or as an alternative, further embodiments of the transport refrigeration system may include that the controller is configured to determine the duration of the first time share phase and the duration of the second time share phase based on a measurement of a charge of the energy storage device.

Technical effects of embodiments of the present disclosure include providing the conventional functionalities of a transport refrigeration system in both road mode and standby mode using only two power bridges and one DC link.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
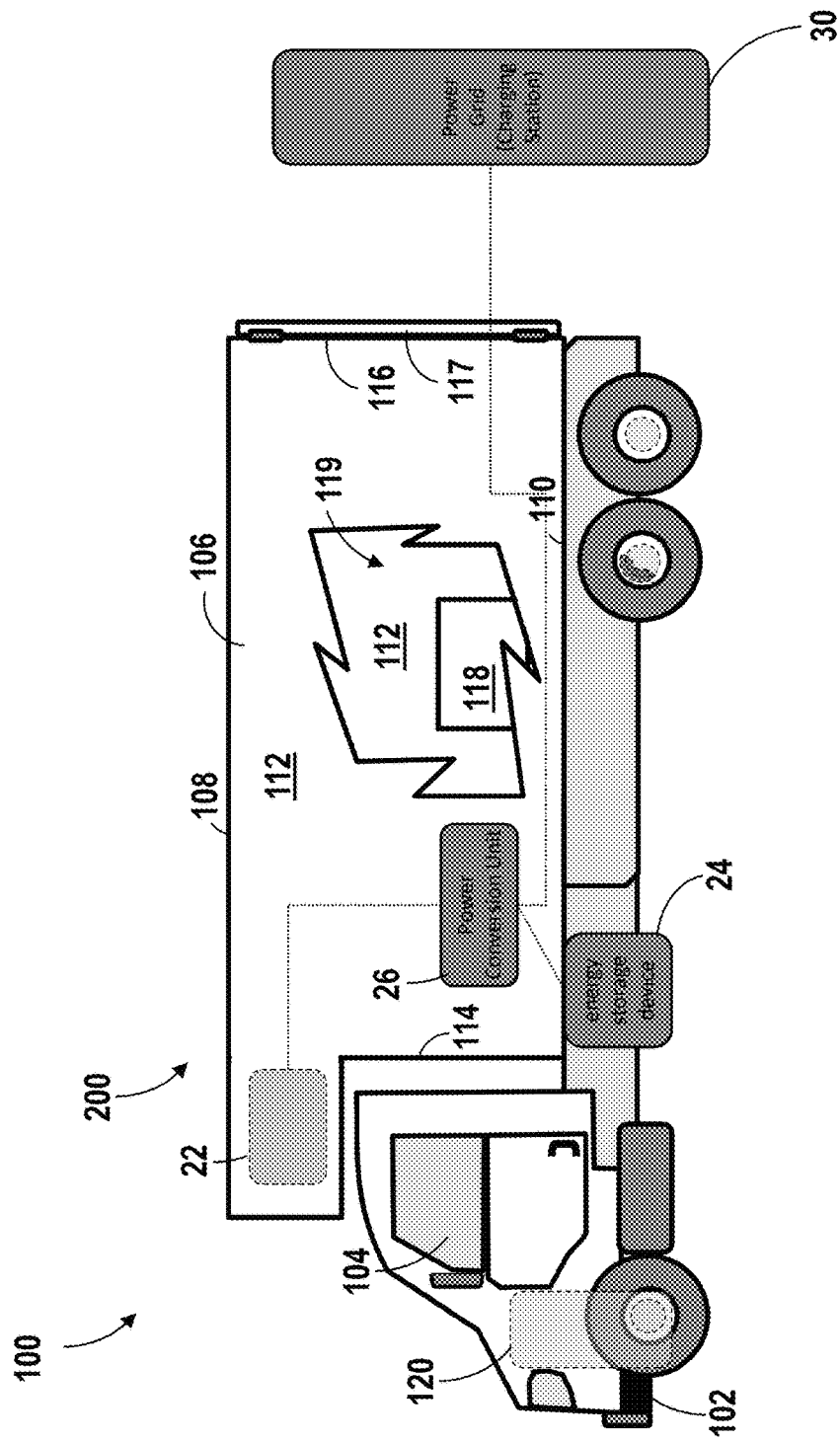
FIG. 1 is a schematic illustration of a transport refrigeration system, according to an embodiment of the present disclosure.
Figure 2A:
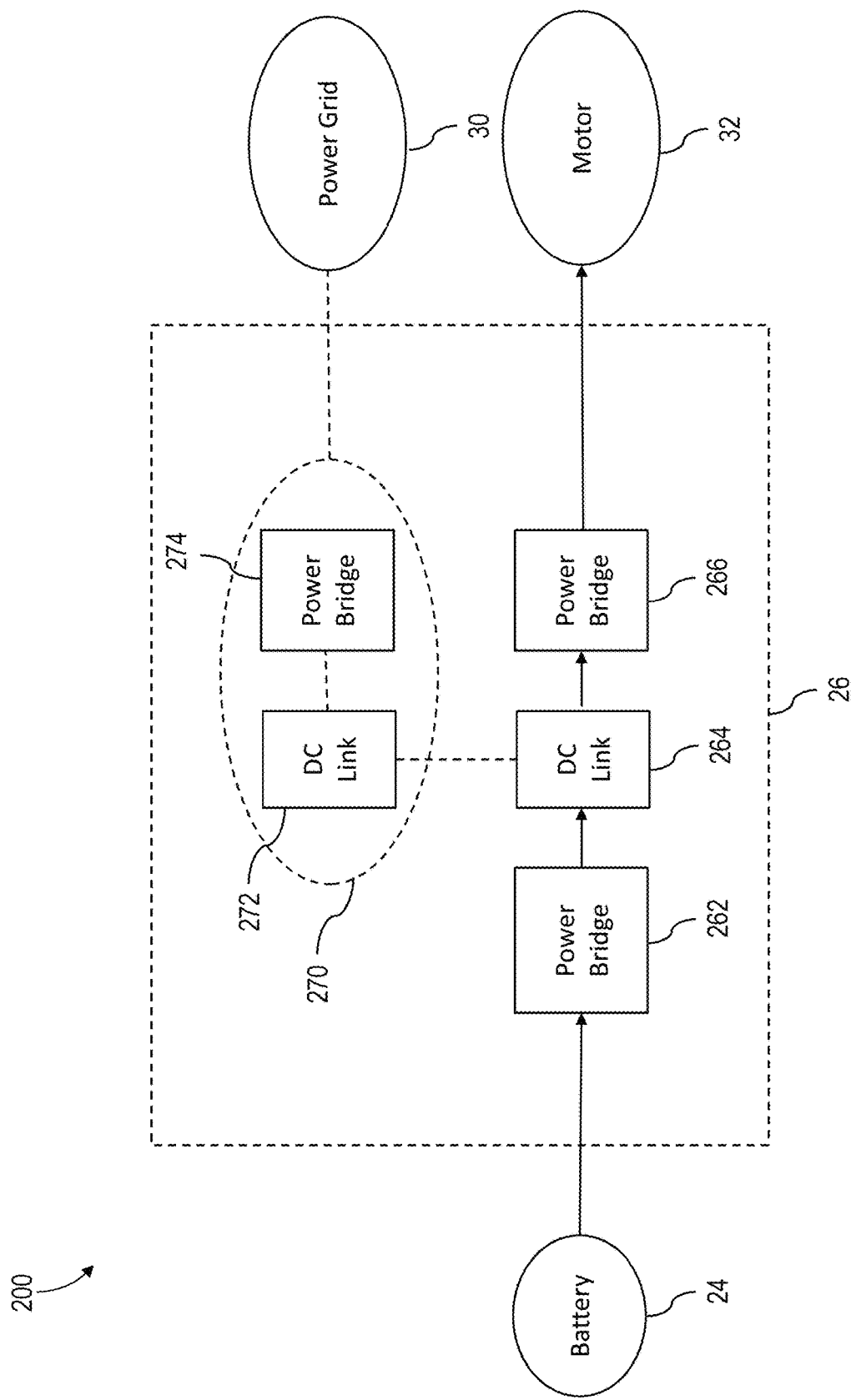
FIG. 2A is a block diagram of a conventional transport refrigeration system operating in road mode.
Figure 2B:
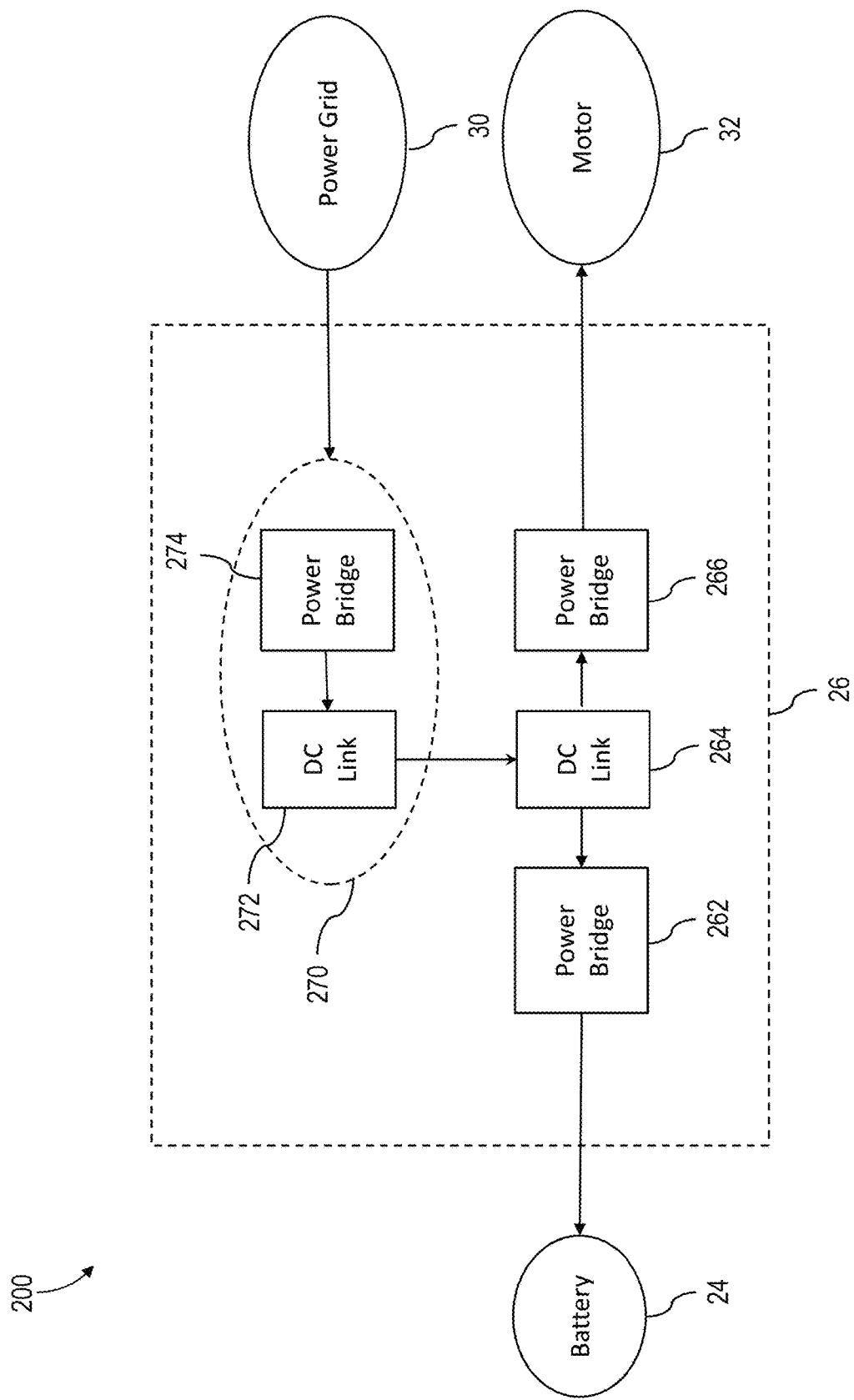
FIG. 2B is a block diagram of a conventional transport refrigeration system operating in standby mode.
Figure 3A:
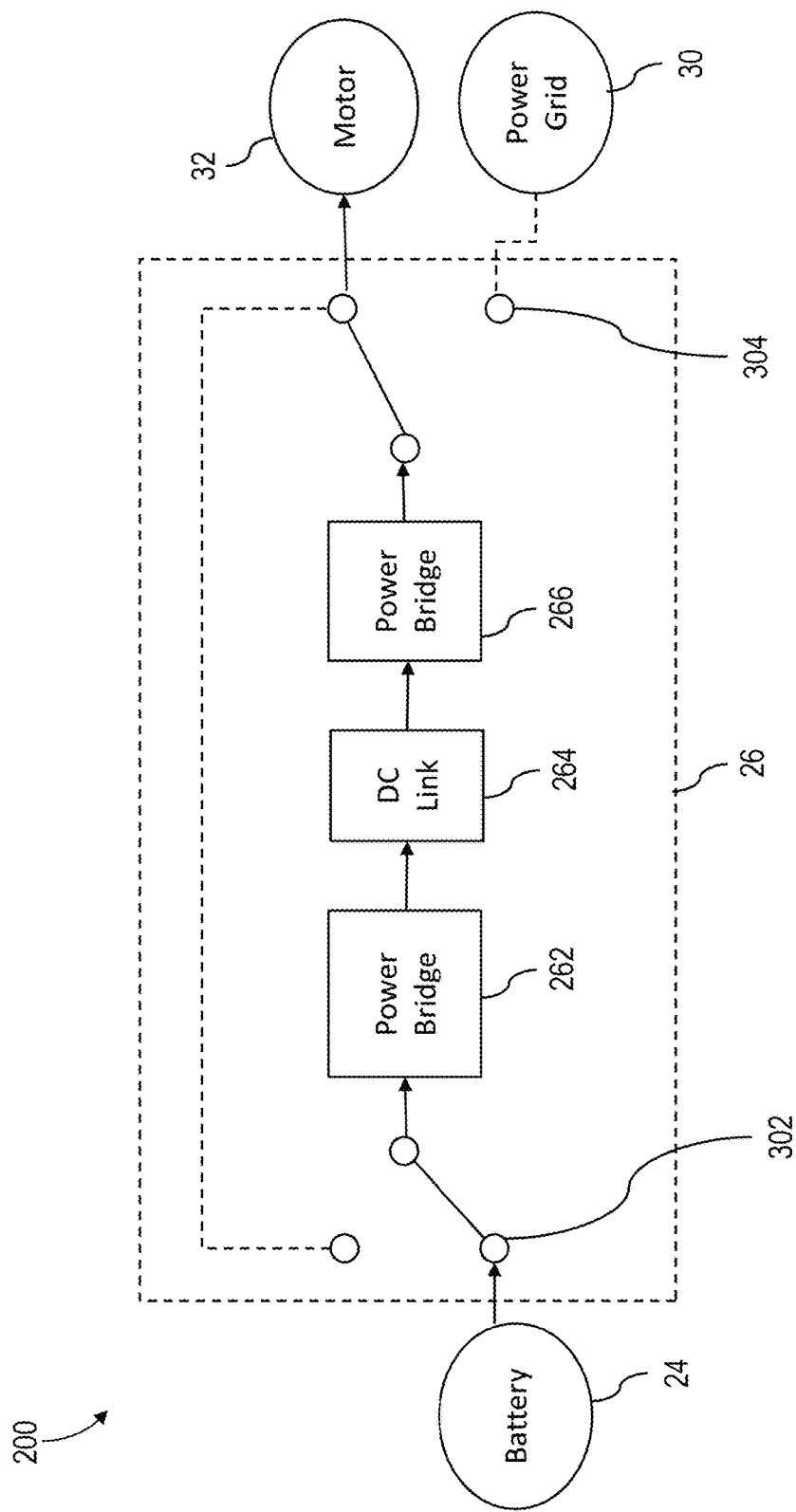
FIG. 3A is a block diagram of a transport refrigeration system operating in road mode according to an embodiment of the present disclosure.
Figure 3B:
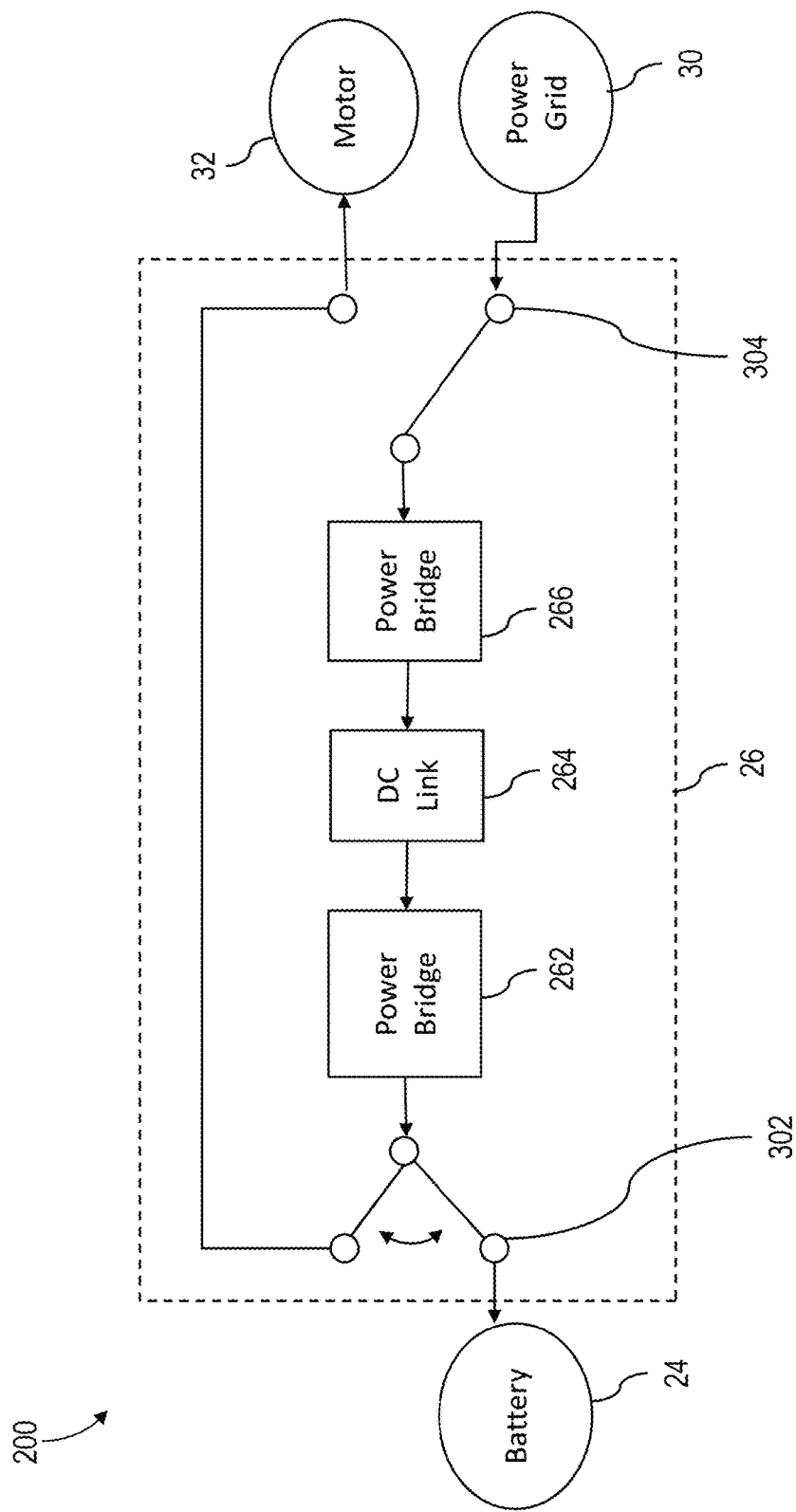
FIG. 3B is a block diagram of a transport refrigeration system operating in standby mode according to an embodiment of the present disclosure.
Figure 4A:
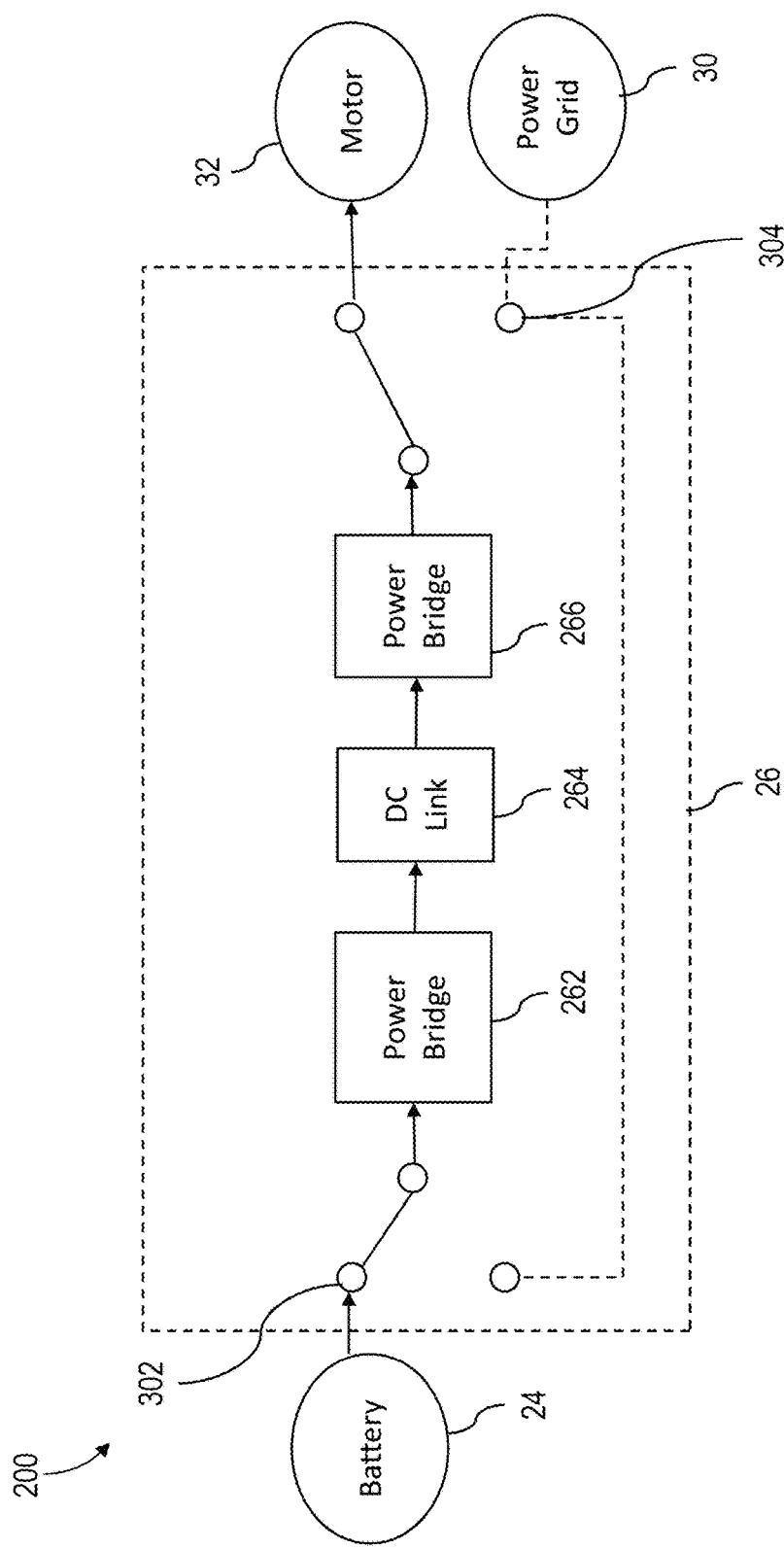
FIG. 4A is a block diagram of a transport refrigeration system operating in road mode according to an embodiment of the present disclosure.
Figure 4B:
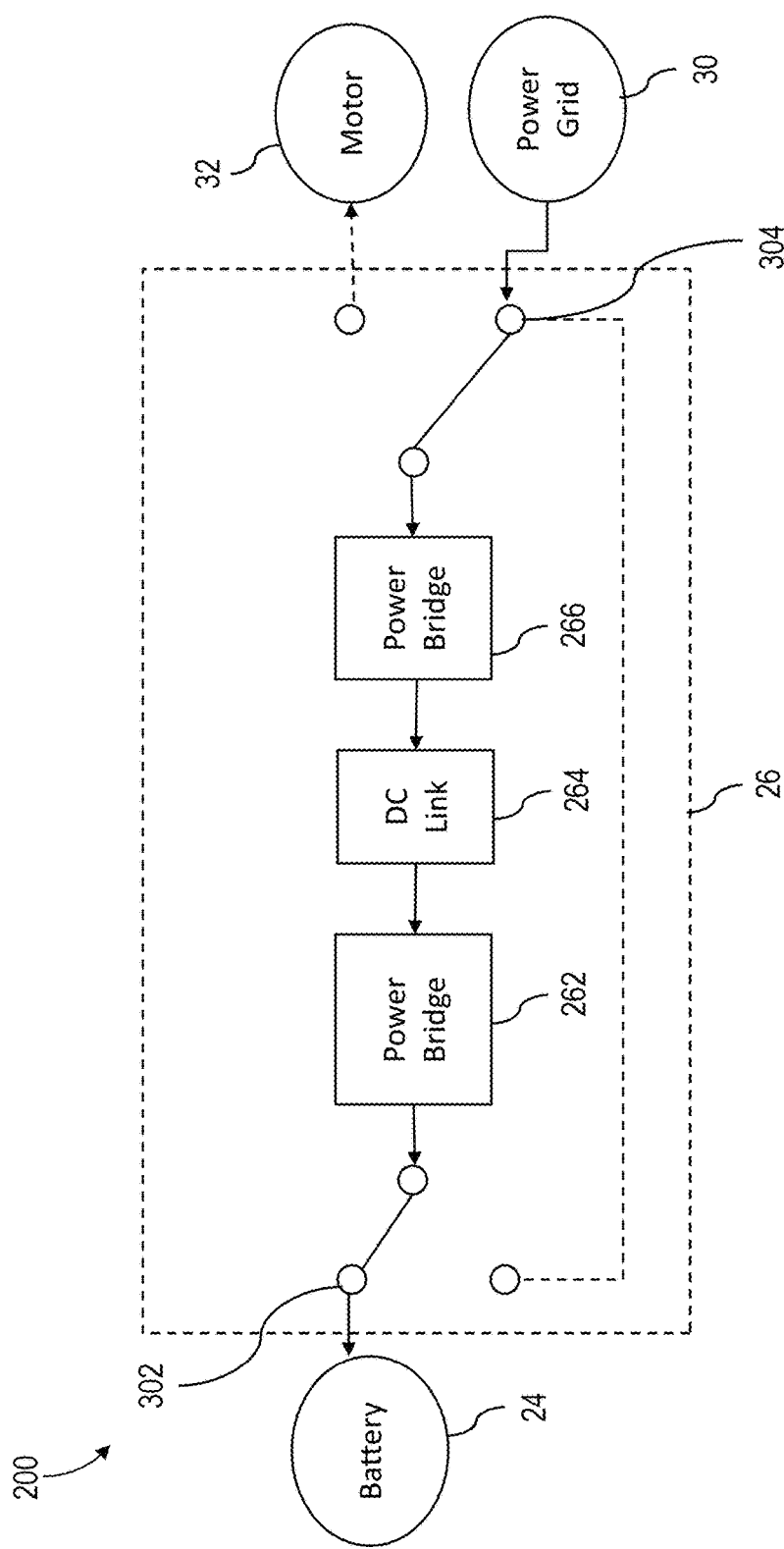
FIG. 4B is a block diagram of a transport refrigeration system operating in standby mode during a first stage of a time share according to an embodiment of the present disclosure.
Figure 4C:
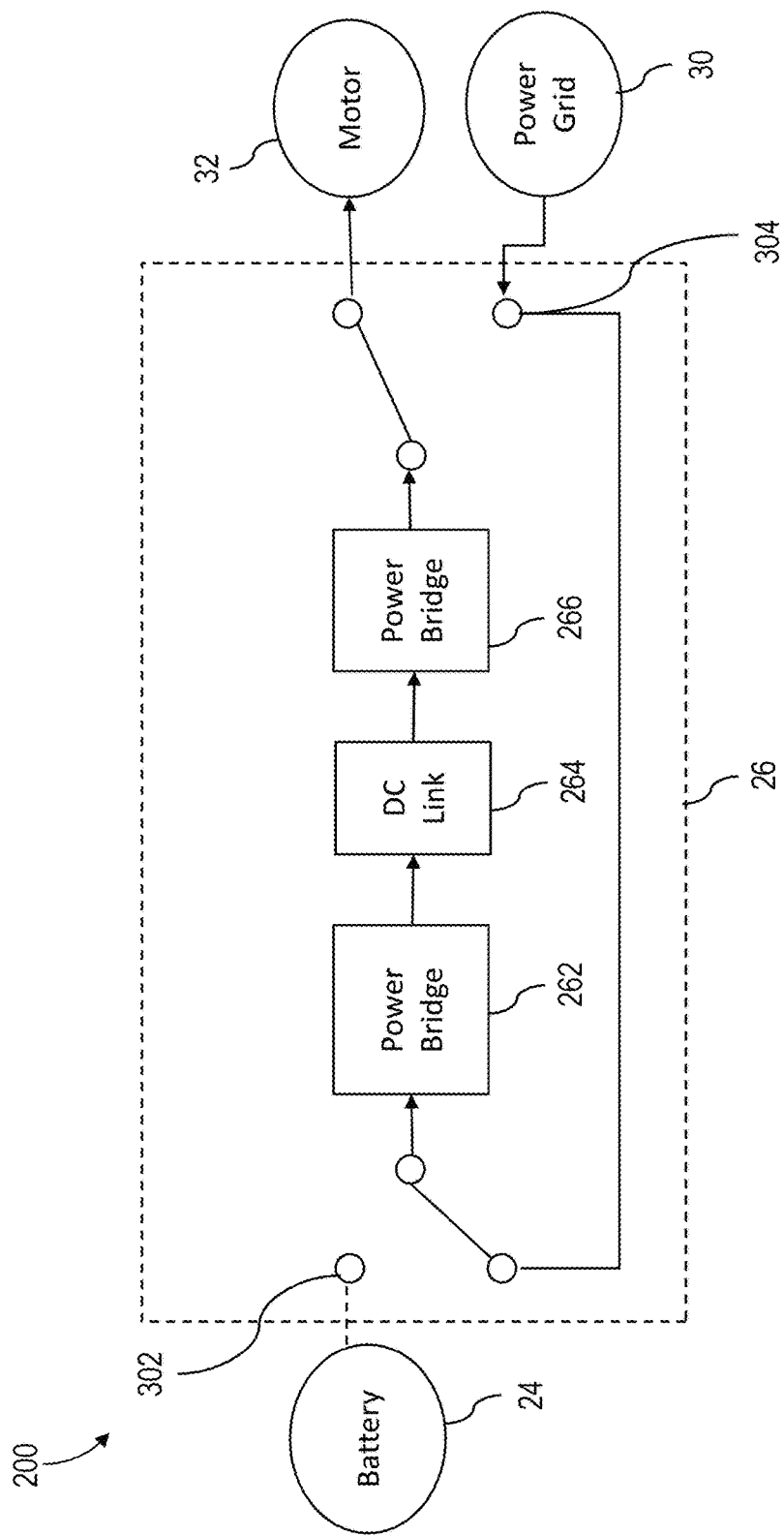
FIG. 4C is a block diagram of a transport refrigeration system operating in standby mode during a second stage of a time share according to an embodiment of the present disclosure.

Referring to FIGS. 1, 3A-3B and 4A-4C, various embodiments of the present disclosure are illustrated. FIG. 1 shows a schematic illustration of a transport refrigeration system 200, according to an embodiment of the present disclosure. FIG. 2A shows a block diagram of a conventional transport refrigeration system operating in road mode, whereas FIG. 3A shows a block diagram of a transport refrigeration system 200 of FIG. 1 operating in road mode according to an embodiment of the present disclosure. FIG. 2B shows a block diagram of a conventional transport refrigeration system operating in standby mode, whereas FIG. 3B shows a block diagram of a transport refrigeration system 200 of FIG. 1 operating in standby mode according to an embodiment of the present disclosure. FIGS. 4A-4C show block diagrams of an alternate embodiment of a transport refrigeration system 200 of FIG. 1 operating in road mode (FIG. 4A) and standby mode (FIGS. 4B-4C).

The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, or a combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. According to some embodiments, the refrigerated cargo space 119 may include a temperature sensor that can measure the temperature of the refrigerated cargo space 119 and provide the measurement to a controller for use in determining the durations of time share phases, as described in greater detail below. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, an energy storage device 24 and a power conversion unit 26. The transportation refrigeration unit 22 includes a refrigerant compression device for providing a heat transfer functionality and an electric motor 32 for driving the refrigerant compression device. The transportation refrigeration unit 22 is in operative association with the refrigerated cargo space 119 and is configured to provide conditioned air to the transport container 106. The transportation refrigeration unit 22 functions, under the control of a controller (not shown), to establish and regulate a desired environmental parameters, such as, for example temperature, pressure, humidity, carbon dioxide, ethylene, ozone, light exposure, vibration exposure, and other conditions in the cargo space 119, as known to one of ordinary skill in the art. In an embodiment, the transportation refrigeration unit 22 is capable of providing a desired temperature and humidity range. According to some embodiments, the controller can include a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Airflow is circulated into and through the refrigerated cargo space 119 of the transport container 106 by means of the transportation refrigeration unit 22. According to some embodiments, the transportation refrigeration unit 22 can include a refrigerant compression device (which includes motor 32), a refrigerant heat rejection heat exchanger, an expansion device, and a refrigerant heat absorption heat exchanger connected in refrigerant flow communication in a close loop refrigerant circuit and arranged in a conventional refrigeration cycle. The refrigerant compression device may be a single-stage or multiple-stage compressor such as, for example, a reciprocating compressor or a scroll compressor. The transportation refrigeration unit 22 can also include one or more fans associated with the refrigerant heat rejection heat exchanger and can be driven by fan motor(s) and one or more fans associated with the refrigerant heat absorption heat exchanger and driven by fan motor(s). The transportation refrigeration unit 22 may also include a heater associated with the refrigerant heat absorption heat exchanger. It is to be understood that other components may be incorporated into the refrigerant circuit as desired, including for example, but not limited to, a suction modulation valve, a receiver, a filter/dryer, an economizer circuit. Those of skill in the art will understand the conventional components and functionality provided by the refrigeration unit 22 to circuit airflow into the refrigerated cargo space 119 and as such they will not be shown or described in detail herein. It will be understood that motor 32 shown in FIGS. 2A-4C can be a component of a refrigeration unit 22 and in particular, motor 32 can be a motor that powers a compressor of the refrigeration unit 22.

The transportation refrigeration unit 22 can be powered by the energy storage device 24 (which may for simplicity be referred to as battery 24), which provides electrical power to the transportation refrigeration unit 22 during operation of the transport refrigeration system in road mode. Examples of the energy storage device 24 may include a battery system (e.g., a battery or bank of batteries), fuel cells, flow battery, and others devices capable of storing and outputting electric energy that may be direct current (DC). The energy storage device 24 may include a battery system, which may employ multiple batteries organized into battery banks. According to some embodiments, the energy storage device 24 may include a sensor that is configured to determine the charge of the energy storage device 24 and provide that information to the controller for use in determining the durations of time share phases, as described in greater detail below.

The battery 24 may be charged by a stationary charging station such as, for example a wall 48V power outlet, or some other outlet connected to a power grid 30. The charging station may provide single phase (e.g., level 2 charging capability) or three phase AC power to the power conversion unit 26, which may then supplied converted power to the energy storage device 24 and/or transportation refrigeration unit 22. It is understood that the charging station may have any phase charging and embodiments disclosed herein are not limited to single phase or three phase AC power. In an embodiment, the single phase AC power may be a high voltage DC power, such as, for example, 500 VDC.

In one embodiment, the energy storage device 24 is located outside of the transportation refrigeration unit 22, as shown in FIG. 1. In another embodiment, the energy storage device 24 is located within the transportation refrigeration unit 22. The transportation refrigeration unit 22 can have a plurality of electrical power demand loads on the energy storage device 24, including, but not limited to, a motor for compressor 32, a drive motor for a fan associated with a refrigerant heat rejection heat exchanger, a drive motor for a fan associated with a refrigerant heat absorption heat exchanger, or any other such aspects of the transportation refrigeration unit 22 that may require electrical power.

The motor 32 used to power the refrigerant compression device is typically an alternating current (AC) motor, whereas the power supplied by the battery 24 is a DC voltage, therefore a power conversion unit 26 is electrically connected between the battery 24 and the refrigerant compression device to convert power supplied from the battery 24 to the refrigerant compression device from DC to AC. The power conversion unit 26 of a transportation refrigeration unit 22 can also connect a power grid 30 to either or both of the battery 24 and motor 32. As will be appreciated by those of skill in the art, the power conversion unit 26 can be configured to change one or more electrical characteristics of an input power signal and output a modified signal having modified characteristics in order to regulate the power between supplies (e.g., battery 24, power grid 30) and loads (e.g., motor 32). For example, the power conversion unit 26 can modify one or more of amplitude, frequency and/or phase of a signal, so that for example, a power signal output by the battery 24 may be changed to have electrical characteristics that are suitable for powering the compressor 32.

As shown in FIGS. 2A-2B, a conventional power conversion unit 26 of a transportation refrigeration unit 22 includes a first power bridge 262, a first DC link 264 and a second power bridge 266 connected in series between the battery 24 and the motor 32, for converting power supplied from the battery 24 to the motor 32. According to some embodiments, a power bridge can include semiconductor devices that perform one or more of the following functions: AC to DC conversion, DC to AC conversion, AC to AC conversion, and DC to DC conversion. In some embodiments, a DC link can be an array of capacitors. Due to the additional source of the power grid 30, a conventional power conversion unit 26 also includes additional circuitry 270 that includes a second DC link 272 and a third power bridge 274 that are connected to the first DC link 264 and are connectable to the power grid 30 (e.g., via plugging in a power cable from the vehicle 102 to a charging station). As will be appreciated by those of skill in the art, this additional circuitry 270 is typically expensive and thus would be desirable to eliminate.

FIG. 2A depicts a conventional power conversion unit 26 of a transport refrigeration system 200 operating in road mode. As shown in FIG. 2A, when in road mode, a conventional power conversion unit 26 supplies power from the battery 24 to the motor 32. As will be appreciated by those of skill in the art, the power conversion unit 26 can, for example, convert a DC power signal supplied by the battery 24 to an AC power signal appropriate for use by the motor 32. During road mode, the power grid 30 is not connected to the transportation refrigeration system 200 and therefore the additional circuitry 270 of the second DC link 272 and the third power bridge 274 is not used and presents a waste of resources.

FIG. 2B depicts a conventional power conversion unit 26 of a transport refrigeration system 200 operating in standby mode. As shown in FIG. 2B, when in standby mode, a conventional power conversion unit 26 supplies power from the power grid 30 to the battery 24 and the motor 32 via the power conversion unit 26. In this case, all three power bridges 262, 266, 274 and both DC links 264, 272 are required convert the power output by the power grid 30 and convert it to power that is suitable for use to both charge the battery 24 and power the motor 32.

FIG. 3A depicts a power conversion unit 26 of a transport refrigeration system 200 operating in road mode according to an embodiment of the present disclosure. As shown in this embodiment, the power conversion unit 26 includes a first switch 302 and a second switch 304. The first switch 302 can selectively connect the first power bridge 262 to the battery 24 or the motor 32. The second switch 304 can selectively connect the second power bridge 266 to the motor 32 or the power grid 30. According to some embodiments, these switches can be controlled by a controller (not shown) that positions the switches based on which mode the transport refrigeration system 200 is operating in. During road mode, the switches are positioned in a first configuration in which the first switch 302 connects the first power bridge 262 to the battery 24 and the second switch is positioned to connect the second power bridge 266 to the motor 32. As shown, the disclosed power conversion unit 26 eliminates the additional circuitry 270 of the second DC link 272 and the third power bridge 274 of the conventional design, which was not needed during road mode.

FIG. 3B depicts a power conversion unit 26 of a transport refrigeration system 200 operating in standby mode according to an embodiment of the present disclosure. As shown in FIG. 3B, during the standby mode, the second switch 304 is positioned to connect the second power bridge 266 to the power grid 30, whereas the first switch 302 cycles back and forth between connecting the first power bridge 262 to the battery 24 and connecting the first power bridge 262 to the motor 32. In this way, the power conversion unit 26 effectuates a time share of the grid power between the battery 24 and the motor 32 by providing limited durations of power to each in a repeated cycle. Each half of a cycle can referred to as a time share phase. Thus, in a first time share phase of a cycle, the battery 24 can be charged using the grid power and in a second time share phase of the cycle the motor 32 can be powered using the grid power. In this way, the battery 24 may charge over time and the motor 32 may continue to be powered in order to provide cool air to the cargo space 119. Both of these ends can be achieved while eliminating the additional circuitry 270 of the second DC link 272 and the third power bridge 274 of the conventional design by utilizing this time sharing method. A controller (not shown) can determine the duration of each time share phase and can varying the phases over time. In some embodiments, the controller may increase or decrease the duration of the time share phase in which the battery 24 is charged using grid power based on a measured charge of the battery 24. For example, if the battery 24 is approaching being fully charged, the controller may decrease the duration of the time share phase in which the battery 24 is charged. Similarly, based on a measured temperature of the cargo space, the controller may increase or decrease the duration of the time share phase in which the motor 32 is supplied with power from the power grid 30. Thus, in some embodiments, if the temperature of the cargo space drops below a threshold temperature, the controller may increase the duration of the share phase in which the motor 32 is supplied with power from the power grid 30. According to some embodiments, the controller may determine the duration of a time share phase based on a combination of the measured temperature of the cargo space and the measured charge of the battery 24.

As will be appreciated by those of skill in the art, the operation of the power conversion unit 26 may differ based on the time share phase the power conversion unit 26 is in. For example, when powering the battery 24 using grid power, the second power bridge 266 can be operable to convert an AC power supplied by the power grid to a DC power and the first power bridge 262 can be operable to change the voltage level of the DC power received from the first power bridge 266 to a new DC level that is appropriate for charging the battery 24. When powering the motor 32 using grid power, the second power bridge 266 may operate in an active rectifier mode to convert an AC power supplied by the power grid 30 to a DC power and reduce grid harmonic distortion and the first power bridge 262 can provide a controlled AC power with a specified amplitude and frequency that is appropriate for operation and control of the motor 32.

FIG. 4A depicts another embodiment of a power conversion unit 26 of a transport refrigeration system 200 operating in road mode according to an alternate embodiment of the present disclosure. As shown in FIG. 4A, the structure of the power conversion unit 26 is different from that shown in FIG. 3A in that the first switch 302 is configured to selectively connect the first power bridge 262 to the battery 24 or the power grid 30 (instead of the motor 32). However, as shown in FIG. 4A, during road mode, the power conversion unit 26 will operate identically to that shown in FIG. 3A by providing power supplied by the battery 24 to the motor 32. As will be described below, during standby mode, both the first switch 302 and the second switch 304 will cycle between different configurations.

FIG. 4B depicts the power conversion unit 26 of FIG. 4A now operating in standby mode during a first stage of a time share according to an alternate embodiment of the present disclosure. As shown, during the first stage of the time share, the first switch 302 is positioned to connect the first power bridge 262 to the battery 24 and the second switch is positioned to connect the power grid 30 to the second power bridge 266. During this stage of the time share, the power grid 30 is used to charge the battery 24.

FIG. 4C depicts a power conversion unit 26 of FIG. 4B now operating in standby mode during a second stage of a time share according to an alternate embodiment of the present disclosure. As shown, during this second stage of the time share, the first switch 302 is positioned to connect the power grid 30 to the first power bridge 262 and the second switch is positioned to connect the second power bridge 266 to the motor 32. During this stage of the time share, the power grid 30 is used to provide power to the motor 32.

Figure 5:
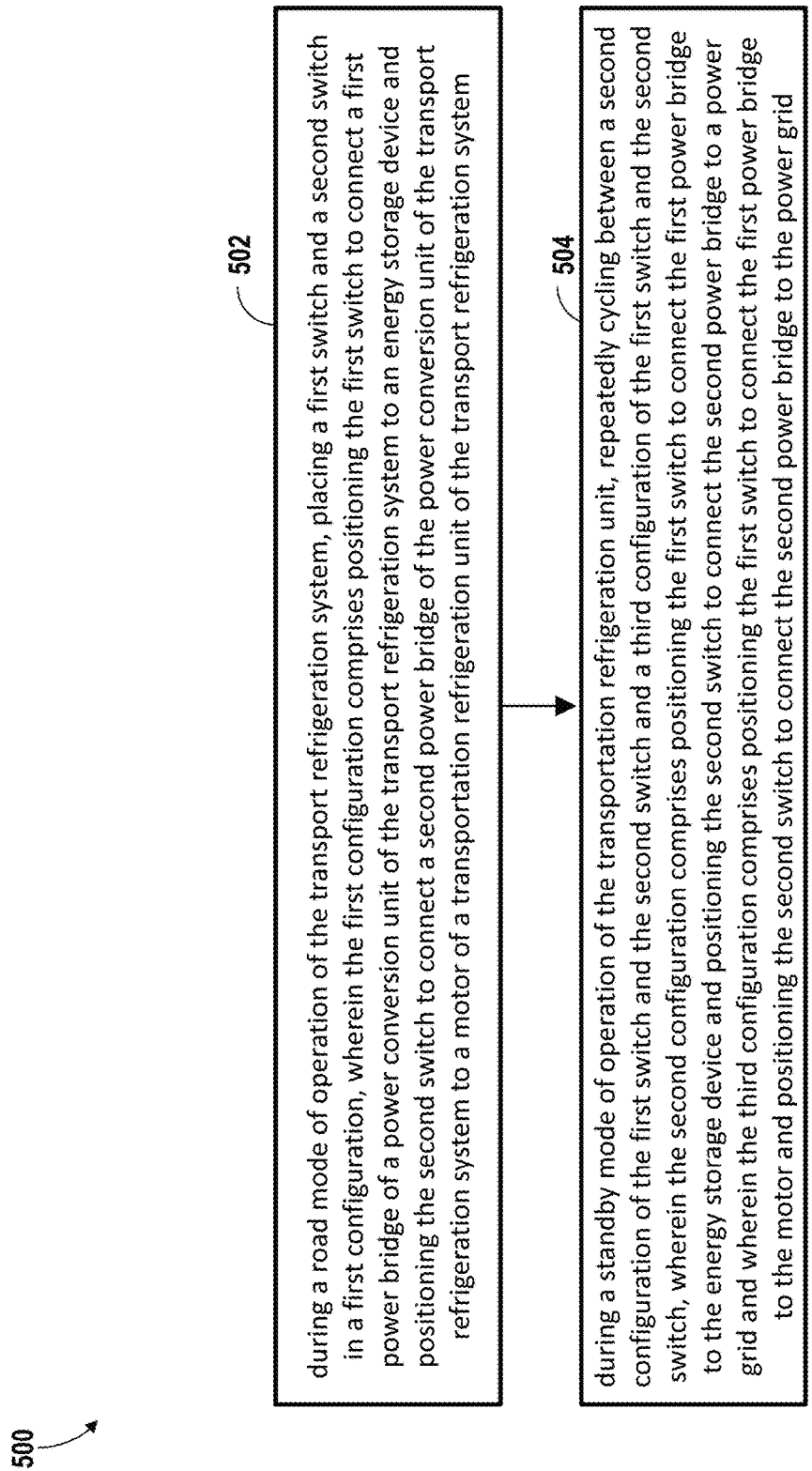
FIG. 5 is a flow process illustrating a method of operating the transport refrigeration system of FIGS. 3A and 3B, according to an embodiment of the present disclosure.

Referring now to FIG. 5, with continued reference to FIGS. 3A and 3B. FIG. 5 shows a flow process illustrating a method 500 of operating a transport refrigeration system 200 comprising a vehicle 102 integrally connected to a transport container 106, according to an embodiment of the present disclosure.

At block 502, during a road mode of operation of the transport refrigeration system 200, the method includes placing a first switch 302 and a second switch 304 in a first configuration. The first configuration comprises positioning the first switch 302 to connect a first power bridge 262 of a power conversion unit 26 of the transport refrigeration system 200 to an energy storage device 24 and positioning the second switch 304 to connect a second power bridge 266 of the power conversion unit 26 of the transport refrigeration system 200 to a motor 32 of a transportation refrigeration unit of the transport refrigeration system 200. During the first configuration, the motor 32 is supplied with power from the energy storage device 24 via the power conversion unit 26.

At block 504, during a standby mode of operation of the transportation refrigeration unit, the method 400 includes repeatedly cycling between a second configuration of the first switch 302 and the second switch 304 and a third configuration of the first switch 302 and the second switch 304. The second configuration includes positioning the first switch 302 to connect the first power bridge 262 to the energy storage device 24 and positioning the second switch 304 to connect the second power bridge 266 to a power grid 30. During this second configuration, the energy storage device 24 will be charged with power from the power grid 30 via the power conversion unit 26. The third configuration includes positioning the first switch 302 to connect the first power bridge 262 to the motor 32 and positioning the second switch 304 to connect the second power bridge 266 to the power grid 30. During this third configuration, the motor 32 is supplied with power from the power grid 30 via the power conversion unit 26.

According to some embodiments, the method further includes determining a duration of the second configuration and a duration of the third configuration of a cycle. For example, in some embodiments, the controller can determine the duration of the second configuration based on a measured charge of the energy storage device 24. Thus, for example, the controller may increase the duration of the second configuration if the charge of the energy storage device 24 is low to allow it more time to charge. In some embodiments, the controller can determine the duration of the third configuration based on a measured temperature of a cargo space 119 of the transport refrigeration system 200. Thus, for example, if the cargo space is below a threshold level of coldness, the controller may determine that more time needs to be spent powering the motor 32 to provide an increased amount of cold air to the cargo space 119. As will be appreciated by those of skill in the art, various different algorithms can be used by the controller to determine the appropriate durations of the time share between the second and third configurations to maximize values such as the charge of the battery 24 or the temperature of the cargo space 119.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
   a transportation refrigeration unit comprising a motor;
   a power conversion unit configured to convert an amplitude, a frequency and a phase of an input electrical power signal, wherein the power conversion unit comprises a first power bridge, a DC link and a second power bridge;
   an energy storage device configured to supply electrical power to the motor via the power conversion unit during a road mode;
   a first switch configured to selectively connect the first power bridge to the energy storage device or the motor; and
   a second switch configured to selectively connect the second power bridge to the motor or a power grid;
   wherein during the road mode, the first switch is positioned to connect the first power bridge to the energy storage device and the second switch is positioned to connect the second power bridge to the motor,
   wherein during a standby mode, the second switch is positioned to connect the second power bridge to the power grid,
   wherein during a first time share phase of the standby mode, the first switch is positioned to connect the first power bridge to the energy storage device, and
   wherein during a second time share phase of the standby mode, the first switch is positioned to connect the first power bridge to the motor.

2. The transport refrigeration system of claim 1, further comprising a controller configured to control the positions of the first switch and second switch during the road mode and the standby mode.

3. The transport refrigeration system of claim 2, wherein the controller is configured to determine a duration of the first time share phase and a duration of the second time share phase and change the position of the first switch at an expiration of the first time share phase and at an expiration of the second time share phase.

4. The transport refrigeration system of claim 3, wherein the controller is configured to continuously cycle between the first time share phase and the second time share phase until the road mode is initiated.

5. The transport refrigeration system of claim 3, wherein the controller is configured to determine the duration of the first time share phase and the duration of the second time share phase based on a measurement of a charge of the energy storage device.

6. The transport refrigeration system of claim 5, wherein the controller is configured to reduce the duration of the first time share phase in response to determining that the charge of the energy storage device exceeds a threshold charge level.

7. The transport refrigeration system of claim 3, wherein the controller is configured to determine the duration of the first time share phase and the duration of the second time share phase based on a measurement of a temperature of a cargo space of the transport refrigeration system.

8. The transport refrigeration system of claim 7, wherein the controller is configured to increase the duration of the second time share phase in response to determining that the temperature of the cargo space is below a threshold temperature level.

9. A method of operating a transport refrigeration system comprising a vehicle integrally connected to a transport container, the method comprising:
during a road mode of operation of the transport refrigeration system, placing a first switch and a second switch in a first configuration, wherein the first configuration comprises positioning the first switch to connect a first power bridge of a power conversion unit of the transport refrigeration system to an energy storage device and positioning the second switch to connect a second power bridge of the power conversion unit of the transport refrigeration system to a motor of a transportation refrigeration unit of the transport refrigeration system;
during a standby mode of operation of the transportation refrigeration unit, repeatedly cycling between a second configuration of the first switch and the second switch and a third configuration of the first switch and the second switch,
wherein the second configuration comprises positioning the first switch to connect the first power bridge to the energy storage device and positioning the second switch to connect the second power bridge to a power grid;
wherein the third configuration comprises positioning the first switch to connect the first power bridge to the motor and positioning the second switch to connect the second power bridge to the power grid.

10. The method of claim 9, wherein during the first configuration, the motor is supplied with power from the energy storage device via the power conversion unit.

11. The method of claim 9, wherein during the second configuration, the energy storage device is charged with power from the power grid via the power conversion unit.

12. The method of claim 9, wherein during the third configuration, the motor is supplied with power from the power grid via the power conversion unit.

13. The method of claim 9, further comprising
determining, by a controller, a duration of the second configuration and a duration of the third configuration of a cycle.

14. The method of claim 13, wherein the controller determines the duration of the second configuration based on a measured charge of the energy storage device.

15. The method of claim 13, wherein the controller determines the duration of the third configuration based on a measured temperature of a cargo space of the transport refrigeration system.

16. A transport refrigeration system comprising:
a transportation refrigeration unit comprising a motor;
a power conversion unit configured to convert an amplitude, a frequency and a phase of an input electrical power signal, wherein the power conversion unit comprises a first power bridge, a DC link and a second power bridge;
an energy storage device configured to supply electrical power to the motor via the power conversion unit during a road mode;
a first switch configured to selectively connect the first power bridge to the energy storage device or a power grid; and
a second switch configured to selectively connect the second power bridge to the motor or the power grid;
wherein during the road mode, the first switch is positioned to connect the first power bridge to the energy storage device and the second switch is positioned to connect the second power bridge to the motor,
wherein during a first time share phase of the standby mode, the first switch is positioned to connect the first power bridge to the energy storage device and the second switch is positioned to connect the second power bridge to the power grid, and
wherein during a second time share phase of the standby mode, the first switch is positioned to connect the first power bridge to the power grid and the second switch is positioned to connect the second power bridge to the motor.

17. The transport refrigeration system claim 16, further comprising a controller configured to control the positions of the first switch and second switch during the road mode and the standby mode.

18. The transport refrigeration system claim 17, wherein the controller is configured to determine a duration of the first time share phase and a duration of the second time share phase and change the positions of the first switch and the second switch at an expiration of the first time share phase and at an expiration of the second time share phase.

19. The transport refrigeration system claim 18, wherein the controller is configured to continuously cycle between the first time share phase and the second time share phase until the road mode is initiated.

20. The transport refrigeration system claim 18, wherein the controller is configured to determine the duration of the first time share phase and the duration of the second time share phase based on a measurement of a charge of the energy storage device.

* * * * *